United States Patent [19]
Liao et al.

[11] Patent Number: 5,341,253
[45] Date of Patent: Aug. 23, 1994

[54] EXTENDED CIRCUIT OF A HIFI KARAOKE VIDEO CASSETTE RECORDER HAVING A FUNCTION OF SIMULTANEOUS SINGING AND RECORDING

[75] Inventors: Pohsien Liao; Chin-Chang Huang; Jye-Huei Wang, all of Taipei, Taiwan

[73] Assignee: Tatung Co., Taipei, Taiwan

[21] Appl. No.: 981,722

[22] Filed: Nov. 28, 1992

[51] Int. Cl.$^5$ .................. G11B 15/12; G11B 27/02
[52] U.S. Cl. ............................. 360/61; 360/13
[58] Field of Search ............... 360/13, 60, 61, 62, 360/66, 68; 358/341

[56] References Cited

U.S. PATENT DOCUMENTS

| | | |
|---|---|---|
| 4,519,008 | 5/1985 | Takenouchi et al. ............ 360/33.1 |
| 5,131,311 | 7/1992 | Murakami et al. ............... 358/342 |
| 5,144,454 | 9/1992 | Cury ................................. 358/335 |

FOREIGN PATENT DOCUMENTS 04-81180  7/1992  Japan .

*Primary Examiner*—Donald Hajec
*Assistant Examiner*—Won Tae C. Kim
*Attorney, Agent, or Firm*—Lowe, Price, LeBlanc & Becker

[57] ABSTRACT

An extended circuit of a HiFi KARAOKE VCR having a simultaneous singing and recording function, wherein an audio erasing head (AE head) on the KARAOKE VCR is used to erase the sound on a normal track of a HiFi KARAOKE program tape and then use the audio control head (A/C head) on the VCR to record the user's desired sound, also stereo, left (L), right (R) or normal sound may be chosen by using an audio select switch on the HiFi VCR. While a tape recorded plays, once the audio select switch selects a normal channel position, the sound recorded on the program tape and the original accompaniment sound of said program tape may be heard.

7 Claims, 4 Drawing Sheets

EXTENDED CIRCUIT OF A HIFI KARAOKE VIDEO CASSETTE RECORDER HAVING A FUNCTION OF SIMULTANEOUS SINGING AND RECORDING

BACKGROUND OF THE INVENTION

1. Field of the Invention

The present invention relates to a circuit for improving functions of a HiFi KARAOKE video cassette recorder (hereinafter referred to as HiFi KTVCR) and, in particular, to an extended circuit of a HiFi KTVCR having a simultaneous singing and recording (SAR) function while in operation.

2. Description of Prior Art

The present invention relates to a HiFi KTVCR having a SAR function. As everybody knows, a KTVCR has become a favorite equipment for use while people are at leisure. A HiFi KTVCR is what people are especially longing for. A common HiFi KTVCR uses a HiFi program tape wherein the singer's voice, accompaniment sound and image are recorded previously. While in use, the user, by the audio select switch, may choose to simply enjoy the singer's voice and image, or otherwise, only the accompaniment sound is played and the user sings by himself (or herself) according to the accompaniment and the subtitle using the microphone.

A HiFi KTVCR of this type has the following imperfection while in use:

1) The singing voice of the user can not be retained in the HiFi program tape. Provided the user wants to hear his (her) own singing voice, he (she) has to sing once more or otherwise record his/her singing voice by a type of recorder. However, under this circumstance, while watching the image and hearing the previously recorded sound at the same time, the sound and the image should be played back in synchronism. It is quite inconvenient to do so.

2) Owing to the fact that the user's voice cannot be introduced into the program tape, its application field is extremely narrow. The application is restricted to a song program tape. As to other applications, such as in the case of a language learning tape, because the user's sound cannot be heard from the program tape, the effects on language learning is unsatisfactory.

In view of the aforementioned drawbacks of a conventional HiFi KTVCR, the present inventor made extensive research and experiments to improve a HiFi KTVCR and thus completed the present invention.

SUMMARY OF THE INVENTION

Accordingly, the present invention aims to provide an extended circuit for a HiFi KTVCR having a simultaneous singing and recording (SAR) function. An extended circuit for a HiFi KTVCR having a SAR function according to the invention also has a function for recording the user's voice while in operation; the sound and image are played back and also the user's voice is received at the same time. Therefore, as one's own wish, the user may hear his (her) own voice from a KTVCR and the application field of a KTVCR is widely broadened.

Another object of the invention is to provide an extended circuit for a HiFi KTVCR having a SAR function wherein after the user's voice is recorded, the original content of the HiFi program tape will not be affected at all.

Yet another object of the invention is to provide an extended circuit for a HiFi KTVCR having a SAR function which not only can record the user's voice, but also may simultaneously erase the last user's voice such that every user has the opportunity to record his (her) own voice and then enjoyably hear the same.

A more complete understanding of these and other features and advantages of the present invention will become apparent from a careful consideration of the following detailed description of certain embodiments illustrated in the accompanying drawings.

DESCRIPTION OF PREFERRED EMBODIMENTS

Figure 1:
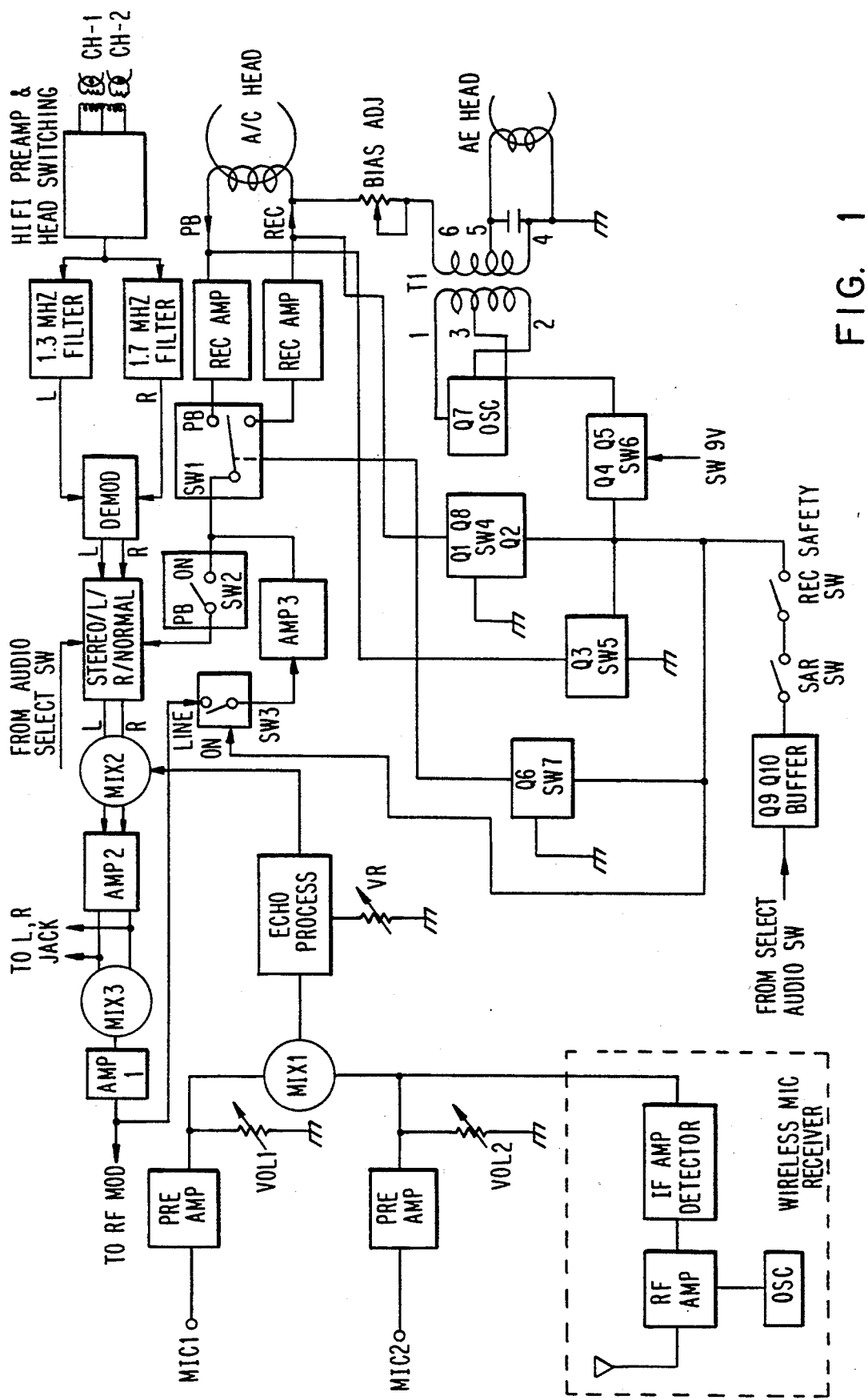
FIG. 1 is a circuit block diagram of the HiFi KTVCR of the present invention.

As shown in FIG. 1, a circuit block diagram, of a HiFi KTVCR according to the present invention comprises a HiFi audio signal processing system, a normal signal processing system, a microphone (MIC) audio signal processing system, and a simultaneously sound playing and recording system. The HiFi audio signal processing system includes audio recording heads for two channels CH1, CH2 which pickup a HiFi audio signal by its frequency modulation (FM) signal through said two audio recording heads provided on a drum. The recording heads CH1 and CH2 are connected to a HiFi preamp and head switching to amplify the signal picked up. The output is then directed to 1.3 MHz and 1.7 MHz filters, respectively. An L and R FM signal are respectively output from these two filters. The abovesaid filters output is transmitted to a demodulator (DEMOD) whereto these two signals are sent to be demodulated into L and R sound signals. Following the demodulator (DEMOD), there are provided successively with a distribution circuit (Stereo/L/R/Normal), a second mixer (MIX2), a second amplifier (AMP2) and then, L and R output terminals; or otherwise, another, third mixer (MIX3) to mix the L and R, and then a first amplifier (AMP1) to output from a radio frequency modulator (RFMOD).

In the normal signal processing system, the one that picks up a normal signal is also an A/C head which has a preamplifier (PREAMP) and a recording amplifier (RECAMP) as the output terminals thereof. Said two amps are connected to a switch SW1 which may automatically switch to a playback (PB) node while simple playing. SW1 also connects to another switch SW2 which is connected to a distribution circuit (Stereo/L/R/Normal). Thus, a normal sound signal may be sent to a distribution circuit, via SW1, SW2, Stereo/L/R/Normal can be selected by an audio select switch. Then, in the switch device SW4, transistors Q8, Q1, Q2 are turned on and Q3 is turned off thereby a complete playback circuit is achieved.

In the mic audio signal processing system, there are two microphones (MIC1, MIC2) which are each connected to a preamplifier (PREAMP) which in turn outputs to a first (MIX1) and then this mixer (MIX1)

connects to an echo processor. The input signals of microphones (MIC1, MIC2) are amplified by the PRE-AMPS, respectively and then mixed and sent to the echo processor. After being processed by the echo processor, the signals are mixed with the L and R audio signals selected by the audio select switch, respectively. Variable resistors Vol1, Vol2 function as volume adjustors for the microphone signals, respectively. VR is an adjustor for adjusting the number of echo. If the microphone is a wireless microphone receiver, it includes a local oscillator, a radio frequency amplifier, a middle frequency amplifier and a detector. A sound signal output from the microphone is mixed in the first mixer, MIX1, with output from a wired microphone.

The simultaneous singing and recording system includes a simultaneous singing and recording switch (SAR SW) connected to a buffer and select switch. A recording safety switch (REC SAFETY SW) is connected to an audio/control head (A/C Head) via a switch SW4 composed of transistors Q1, Q2, Q8. An audio erase head (AE head) is connected to secondary wiring under a transformer, then via a bias adjust resistor (Bias adj) connected to the aforesaid A/C head, which in turn connects to a recording amplifier (REC AMP). Furthermore, this system includes an oscillator (OSC) Q7 connected to the primary wiring of a transformer T1, transistor switches SW6, SW5 and another transistor switch SW7 connected to the switch SW1.

Again, with reference to FIG. 1, in a preferred embodiment of the HiFi KTVCR of the invention, a Stereo/L/R/Normal audio select switch and an IC are used. Their functions will be discussed in the case of normal playing and simultaneously singing and recording, respectively.

A) while in normal playing

1) Referring to FIG. 1, a HiFi audio signal has its FM signal picked up by the audio heads CH1, CH2 on a drum. Then via a 1.3 MHz and 1.7 MHz filters, respectively, L and R FM signals are output to a demodulator (DEMOD) to demodulate an L channel and R channel audio signal. Then HiFi audio signals are provided at L and R.

Figure 2:
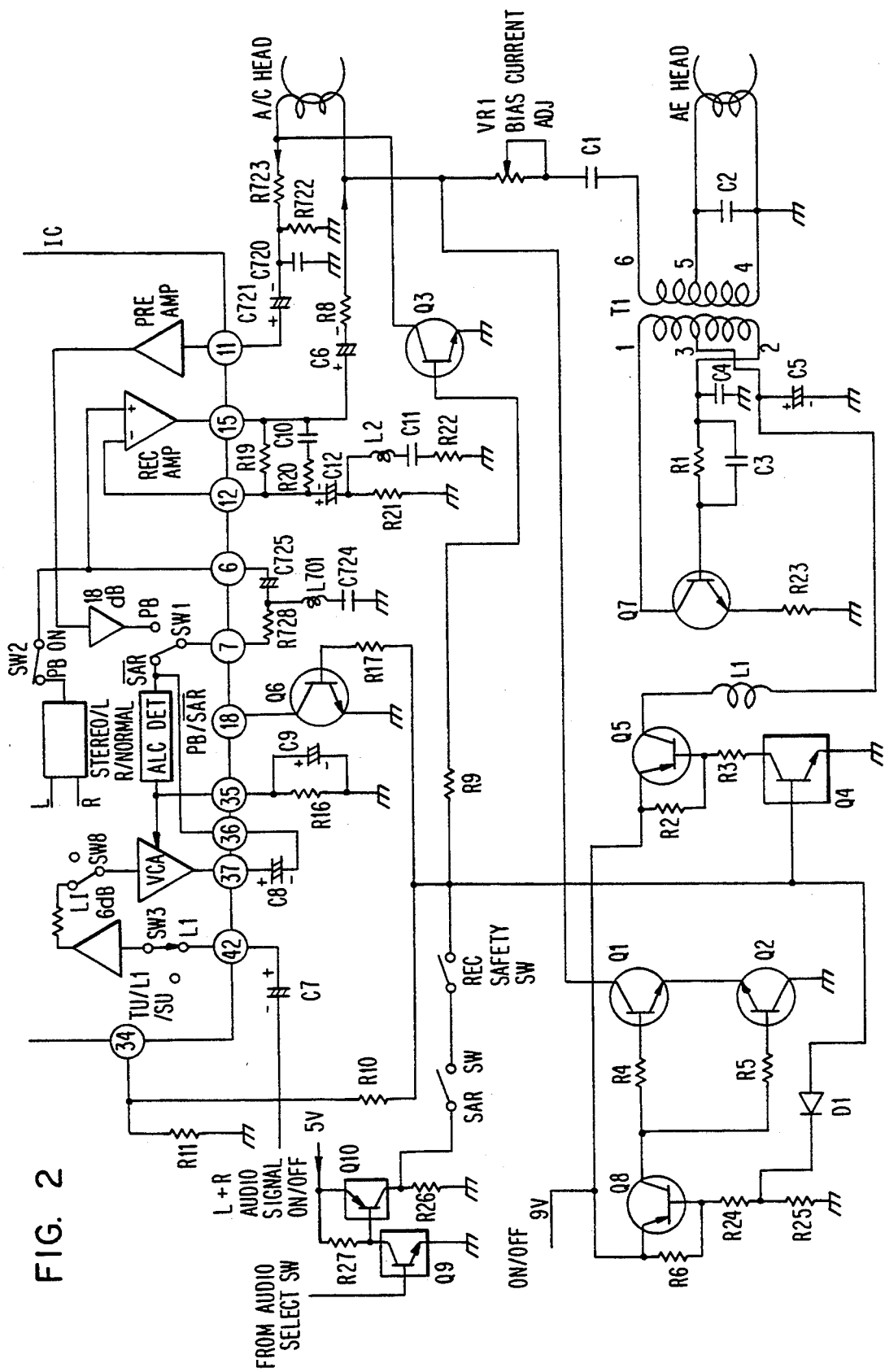
FIG. 2 is a circuit diagram of post audio recording according to the invention.
Figure 3A:
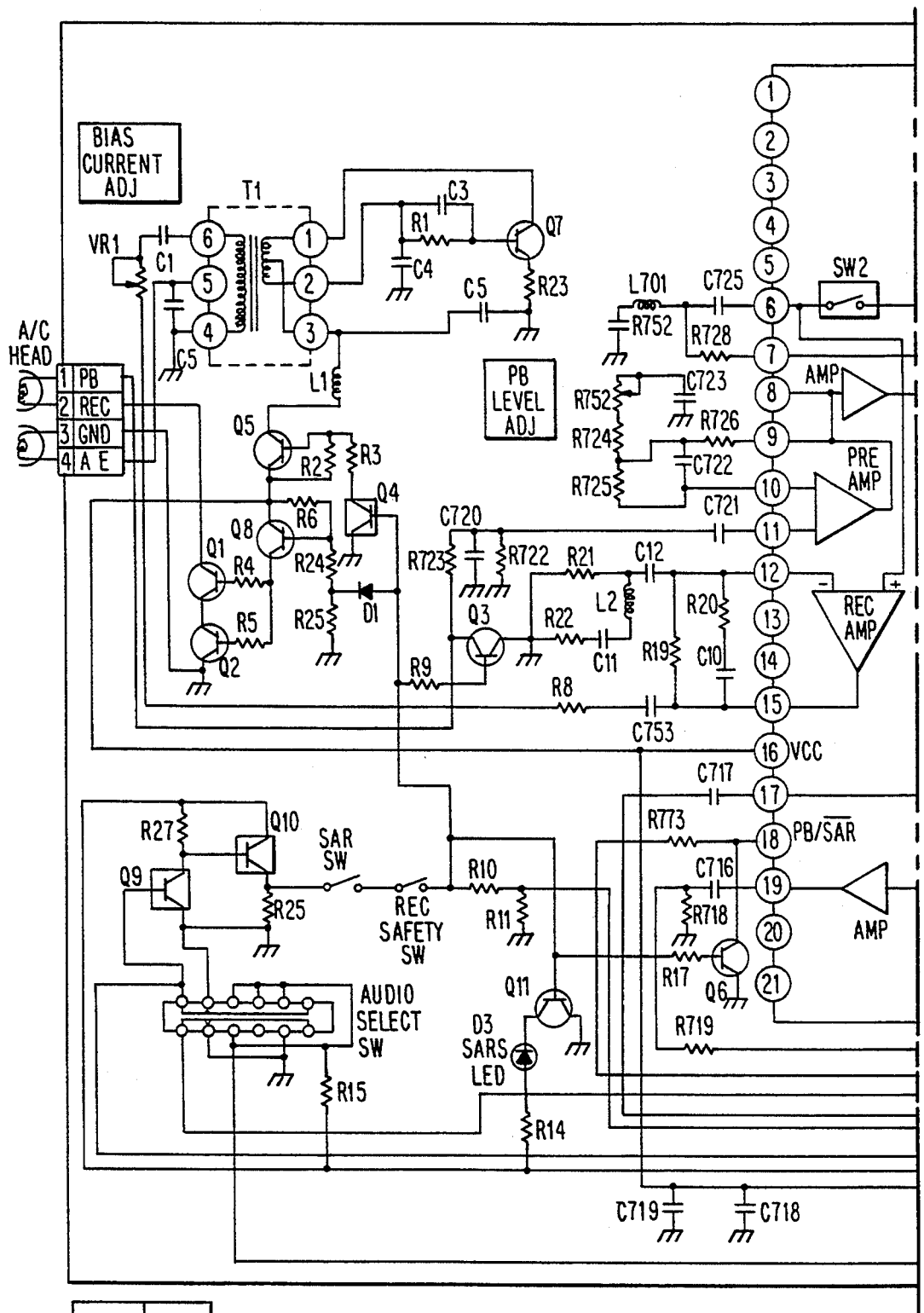
FIG. 3A-3B is a schematic diagram showing the SAR circuit portion according to the invention.
Figure 3B:
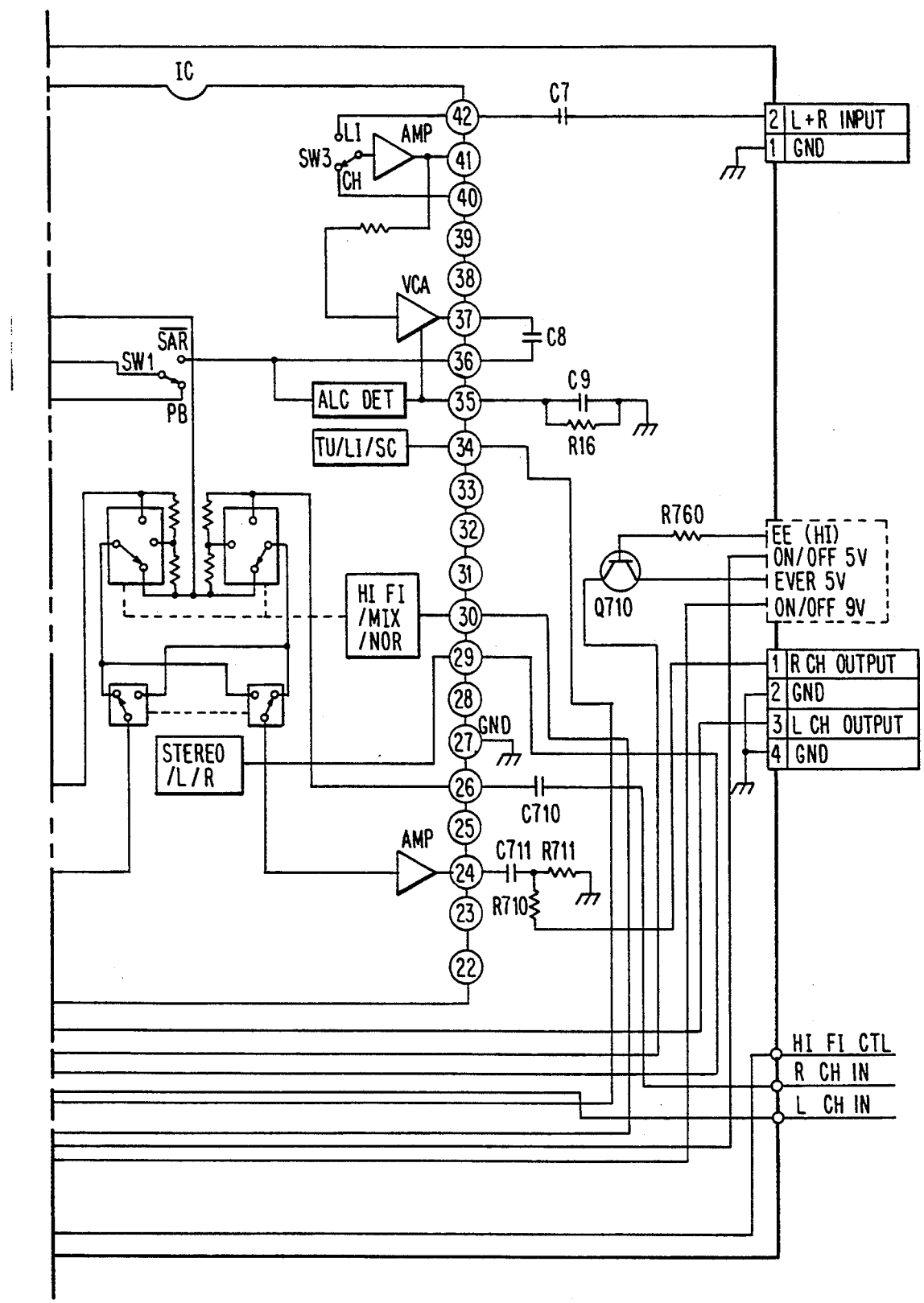

2) Referring to FIGS. 1, 2, and 3, after pick up by an audio control head (A/C Head), a normal audio signal is amplified by PRE AMP of the 11th lead of the IC. Since the SW1 of the IC connected to the PRE AMP is automatically switched to PB node while playing (except in the case of simultaneously singing and recording), and the switch SW2 of the IC connected to a REC AMP is also turned ON while in playing, a normal audio signal can be sent, via switches SW1 and SW2, to a select circuit (Stereo/L/R/Normal) connected to the switch SW2 and also in the IC. The signal is selected by an audio select switch (Audio Select SW). At that time, a transistor Q8 of a transistor switch SW4 is turned ON and also the transistors Q1 and Q2 are turned on in order to pick up a normal signal.

3) Nowadays there are two ways of using a microphone audio signal. One is using two wired microphones and another is using one each of wired and wireless microphones. When two wired microphones are used, audio signals input from microphones MIC1, MIC2 are amplified by a pre-amplifier (PRE AMP) and then mixed in a mixer MIX1. Following that, they are sent to an echo processor (ECHO PROCESSOR) and after processing, they are mixed with $L_{CH}$ and $R_{CH}$, respectively. While in the case of one each of wired and wireless microphones, the function of the wireless microphone receiver is almost the same as typical FM radio. The volume of the wired microphone is adjusted by VOL1 and VOL2, besides, the echo number is adjusted by adjusting VR. Following selection by the audio select switch, audio signals of $L_{CH}$ and $R_{CH}$ are input via microphone MIC, and then after echo processing, mixing and amplifying, audio signals are sent to audio output terminals, L, R JACK. On the other hand, signals from the left channel ($L_{CH}$) and the right channel ($R_{CH}$) are mixed and amplified, then sent to RF MOD switch SW3 in the IC respectively to serve as an audio signal source for simultaneous singing and recording.

B) While in simultaneous singing and recording

During the playing of a HiFi KTVCR, when the audio select switch is set at the stereo or L or R position of the distribution circuit and a tab is retained on a tape, if SARS SW is pressed, only a normal circuit will automatically switch to recording and the HiFi circuit will be maintained for playing. Under such circumstances, the path of an audio signal is as follows:

1) Same as in a normal playing, from a HiFi audio signal, FM signals are picked up by audio heads CH1, CH2 on the drum and then output as L and R FM signals, via a 1.3 MHz and 1.7 MHz filters, respectively, to a demodulator (DEMOD) to be demodulated into audio signals of a L channel and a R channel. Then, a HiFi audio signal is obtained at L and R, respectively.

2) Again, same as in normal playing, according to the state of art, there are two ways of using MIC audio signals, wherein one by using two wired microphones and another by using one each of wired and wireless microphones. In the case of using two wired microphones, audio signals input from microphones MIC1 and MIC2 are first amplified by a preamplifier (PRE AMP), and mixed in a mixer MIX1. Then after echo processing in the echo processor is completed, they are mixed with the left channel and the right channel ($L_{CH}$, $R_{CH}$), respectively. If using one each of wired and wireless microphones, the wireless microphone receiver functions almost the same as a common FM radio. The volume of the wired microphone is adjusted by Vol1, Vol2, and the number of echo is adjusted by VR. After selection by Audio Select Switch, audio signals of left channel ($L_{CH}$) and right channel ($R_{CH}$) are input via a microphone MIC. After echo processing, mixing and amplifying, audio signals are sent to audio output terminals, ($L_{CH}$ and $R_{CH}$ JACK). On the other hand, signals from the left channel ($L_{CH}$) and the right channel ($R_{CH}$) are mixed, amplified and then sent to the modulator (RF MOD).

3) The travel path of a normal audio signal is as follows: Referring to FIGS. 1, 2, 3, a control signal of a normal circuit is mainly controlled by an audio select switch. When using a HiFi video tape and the audio select switch (Audio Select SW) is set at a position of Stereo, left channel ($L_{CH}$) or right channel ($R_{CH}$), an "H" voltage will be sent to the base of the transistor Q9 of a buffer to turn the transistors Q9 and Q10 of the buffer ON, and about 5 V voltage is applied on a resistor R26. Because the simultaneous singing and recording switch (SAR SW) is connected in serial with the REC SAFETY SW, at this moment if the SAR SW is pressed and there exists a tab on the video tape, both of these two switches will be turned ON and the voltage on the resistor R26 will be supplied to various control circuits. Therefore, the normal circuit starts to record. A switch SW7 which consists of a transistor Q6 is turned ON and a switch SW1 is switched to the SAR node. The switch SW2 is an open circuit and a switch SW3 is turned ON. The audio signal selected by the audio select switch (Audio Select SW) is distributed, via a Stereo/L/R/-Normal distribution circuit to a left channel ($L_{CH}$) and a right channel ($R_{CH}$), which is mixed with the signals from the microphone MIC, echo processed, respectively, and then amplified. Audio signals of the channel ($L_{CH}$) and the right channel ($R_{CH}$) are mixed at the third mixer (MIX3), and sent via an amplifier (AMP1), a switch (SW3), an amplifier (AMP3), and a switch (SW1) to a recording amplifier (REC AMP) to have the audio signal current overlap with an AC bias and then flow through A/C Head. At that time, a switch (SW5) consisting of a transistor Q3 is turned ON and the switch SW4 consisting of transistors Q1, Q2 and Q8 is not turned ON. This completes an entire record circuit and the audio signal is recorded on a normal track of a video tape.

4) Erasing and recording of a normal audio signal a) Erasing: A magnetic tape is composed of a great number of minute magnetic powder particle adhered on a substrate. If there are some signals recorded thereon, the magnetic orientation is irregular. An erasing action makes all the magnetic orientations consistent. A typical erasing method is by AC erasing (zero erasing). In a VCR DECK apparatus, an audio erasing head (AE head) is arranged before an audio control head (A/C head), so that the karaoke tape passes by the AE head first and then the A/C head. Under the circumstance of simultaneous singing and recording, all the transistors Q4, Q5 and Q7 are turned ON, and they form a Hartley oscillator (of a frequency about 70 Khz) with a transformer T1. An AC signal oscillated by said oscillator is taken from the secondary wiring of T1 and directly applied onto the AE head and the erasing operation is completed.

b) Recording: Now recording on a magnetic tape is mainly by AC bias. This method comprises overlapping a radio frequency AC bias onto an audio signal current. In the case of simultaneous singing and recording, a switch SW4 composed of transistors Q1, Q2 and Q8 is opened, a transistor Q3 is turned ON, and an oscillated AC signal is taken from the secondary wiring of a transformer T1, passing through a bias resistor VR to adjust the bias current flowing through the A/C Head. After the audio signal current is overlapped with the AC bias, it is sent to the A/C Head to be recorded on a magnetic tape. Thus a recording on a magnetic tape is achieved.

In view of the above, a gain circuit of a HiFi KARAOKE VCR having a SAR function according to the invention actually has the effect of recording the singing voice of the user on a HiFi video tape, and improves the drawbacks of a conventional system. That is, when replaying the voice and watching the image is desired, the audio and video are played back in synchronism.

Although the present invention has been described with a certain degree of particularity, the present disclosure has been made by way of example and changes in details of structure may be made without departing from the spirit thereof.

What is claimed is:

1. An extended circuit of a HiFi karaoke video cassette recorder (KTVCR) having a simultaneous singing and recording (SAR) function which comprises:
    a HiFi audio signal processing system which receives a HiFi signal, and outputs the received HiFi signal via a left channel and a right channel;
    a normal signal processing system wherein a normal signal is received from a program tape by an audio control head and sent to a Stereo, left channel ($L_{CH}$), right channel ($R_{CH}$) or Normal distribution circuit selected by an audio select switch;
    a microphone audio signal processing system, wherein an output of at least one microphone is amplified by a signal amplifier, the amplifier output is mixed in a first mixer, the first mixer output is processed by an echo processing unit and the echo processing unit is mixed with the HiFi signals output via the left and right channels in a second mixer;
    a simultaneous singing and recording system (SAR system) including an a SAR switch, an audio control head and an audio erase head;
    wherein while the KTVCR is in a playing mode, when the audio select switch is selected to the Stereo, left channel ($L_{CH}$) or right channel ($R_{CH}$) distribution circuit, by pressing the SAR switch, the Normal distribution circuit will automatically switch to a state of simultaneous singing and recording, the audio erase head will erase a normal signal previously recorded on the program tape, then the audio control head will record on the program tape an output of the second mixer distributed via the distribution circuit selected by the audio select switch and after which, once the audio select switch is selected to the Normal distribution circuit, the recorded output of the second mixer will be received by the normal signal processing system.

2. A extended circuit of a KTVCR having a SAR function as claimed in claim 1, further comprising a third mixer, a second signal amplifier, a voltage control amplifier, a record amplifier and an AC bias adjuster wherein with the Normal distribution circuit in the simultaneous singing and recording state, left and right channel signals output from the second mixer are mixed in the third mixer and, then the third mixer output is amplified by said second signal amplifier, the second signal amplifier output is amplified by the voltage control amplifier, and the voltage control amplifier output is converted into an audio signal record current by the record amplifier, the audio signal record current is overlapped with an AC bias by the AC bias adjuster and then recorded on the program tape by the audio control head.

3. An extended circuit of a KTVCR having a SAR function as claimed in claim 2, wherein said microphone audio signal processing system includes two microphones, and the output of each of the microphones is transmitted over a wire.

4. An extended circuit of a KTVCR having a SAR function as claimed in claim 2, wherein said microphone audio signal processing system includes two microphones, and the output of one of said microphones is transmitted over a wire and the output of the other said microphone is transmitted by radio frequency transmission.

5. An extended circuit of a KTVCR having a SAR function as claimed in claim 1, wherein: in the case of simultaneous singing and recording, if the audio select switch is selected to the Normal distribution circuit, the normal signal previously recorded on the program tape is retained and the SAR system cannot be actuated.

6. An extended circuit of a KTVCR having a SAR function as claimed in claim 5, wherein said microphone audio signal processing system includes two microphones, and the output of each of the microphones is transmitted over a wire.

7. An extended circuit of a KTVCR having a SAR function as claimed in claim 8, wherein said microphone audio signal processing system includes two microphones, and the output of one of said microphones is transmitted over a wire and the output of the other said microphone is transmitted by radio frequency transmission.

* * * * *